Oct. 28, 1924.
C. C. HALL
1,513,548
PACKING AND METHOD OF MAKING THE SAME
Filed July 16, 1923    2 Sheets-Sheet 2
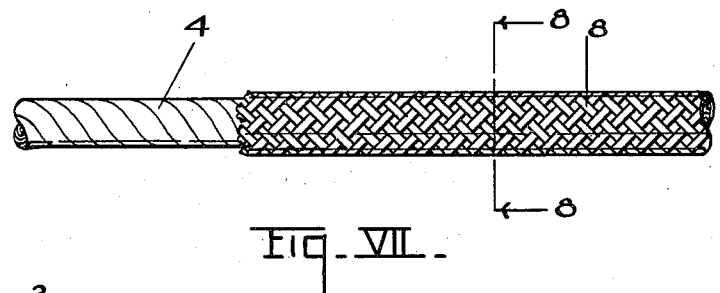
Fig. VII.
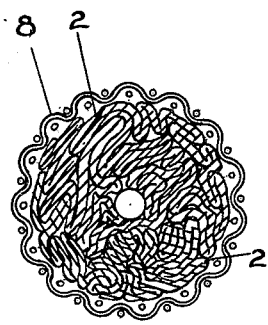
Fig. VIII.
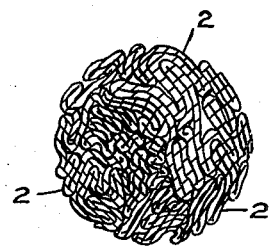
Fig. IX.
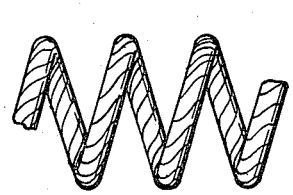
Fig. XI.
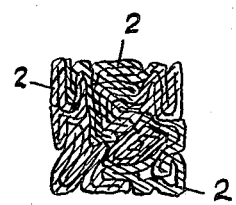
Fig. X.
Inventor
Charles C. Hall
By Chappell & Earl
Attorneys Patented Oct. 28, 1924.

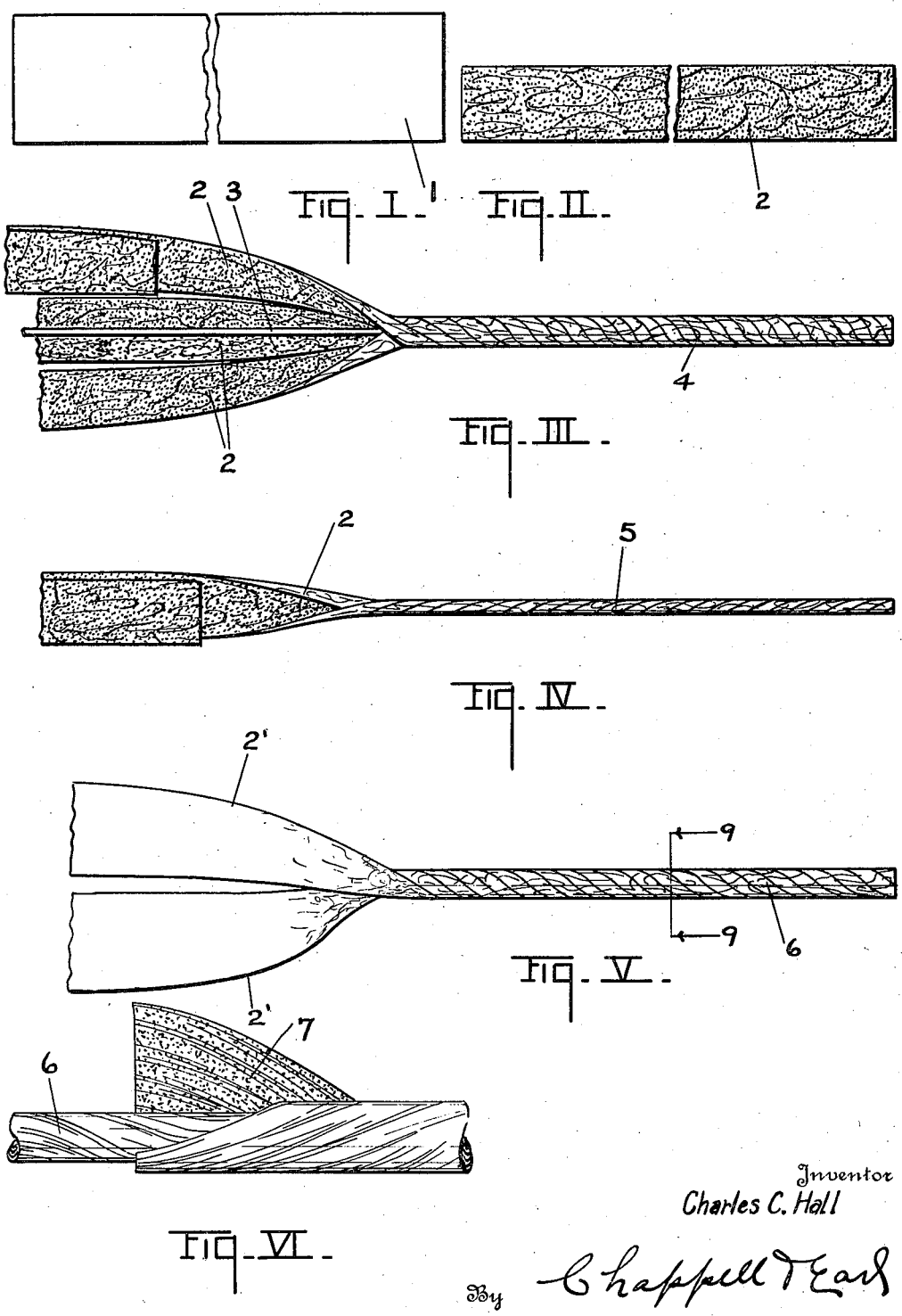

1,513,548

UNITED STATES PATENT OFFICE.

CHARLES C. HALL, OF KALAMAZOO, MICHIGAN.

PACKING AND METHOD OF MAKING THE SAME.

Application filed July 16, 1923. Serial No. 651,882.

*To all whom it may concern:*

Be it known that I, CHARLES C. HALL, a citizen of the United States, residing at the city and county of Kalamazoo, State of Michigan, have invented certain new and useful Improvements in Packings and Methods of Making the Same, of which the following is a specification.

This invention relates to improvements in packings and methods of making the same.

The main objects of the invention are:

First, to provide an improved packing which is adapted for various uses, that is, it may be used for steam or hydraulic packings.

Second, to provide an improved packing which is self-lubricating and may be formed in continuous strips of any desired length, so that it may be cut off in sections to suit the particular requirements, thereby avoiding waste such as frequently occurs where packings are formed of relatively short lengths and are in practice employed for various purposes.

Third, to provide an improved packing which may be made up of a plurality of strips in which they are effectively united or combined in a unitary structure, lubricant being combined with and effectively retained even when the packing is subjected to heavy pressure.

Fourth, to provide an improved packing which has anti-frictional qualities and at the same time is durable and has considerable tensile strength.

Objects pertaining to details and economies of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a fragmentary plan view of a strip of thin sheet metal or metal foil.

Fig. II is a fragmentary plan view of the same strip crumpled and coated with lubricant.

Fig. III is a side view of a partially formed packing illustrating the packing and method of manufacture.

Fig. IV is a view of a partially formed modified form of packing illustrating the packing and method of manufacture.

Fig. V is a detail view of a packing corresponding to that of Fig. III with the core omitted.

Fig. VI is a detail view of another form of my improved packing, the same being partially formed to illustrate the structure thereof.

Fig. VII is a view of still another modified form of my improved packing having a braided casing.

Fig. VIII is a cross section on a line corresponding to line 8—8 of Fig. VII.

Fig. IX is a cross section on a line corresponding to line 9—9 of Fig. V, the crumples and convolutions being exaggerated for convenience in illustration.

Fig. X is a cross section of the packing compacted to a rectangular form.

Fig. XI is a side view of a portion of my improved packing formed into a coil illustrating a convenient form for placing upon the market.

In the drawing similar references refer to similar parts throughout the several views and the sectional views are taken looking in the direction of the little arrows at the ends of the section lines.

Referring to the drawing, 1 illustrates a strip of thin sheet metal or metal foil and 2 the same sheet or strip crumpled or crinkled and having applied thereto a lubricant preferably consisting of oil and a suitable solid lubricant material such as flaked or powdered graphite.

These crumpled or crinkled strips are then twisted by a spiral twist into a strand, preferably a plurality of strips being twisted together providing a strand of the packing which may be cut into suitable lengths for the purpose for which it is particularly intended. These strips are preferably of different metals such as lead, which has anti-frictional qualities, and aluminum, which supplies tensile strength and heat resisting qualities. I sometimes also employ a strip or strips of copper.

The sheets may be crumpled prior to twisting or twisted from flat strips as indicated in Fig. V. The act of twisting is very effective in crumpling and providing pockets in which the lubricant is effectively retained. The twisting of the strands together brings the different metals of the strands into intimate association and quite uniform distribution throughout the whole packing results.

By combining the metals in this manner I provide a packing which is of wide application, that is, it may be used to meet all the various conditions in an ordinary steam plant running under saturate steam. This avoids the necessity of carrying more than one grade of packing and also reduces the possibility of accident or damage on account of inexperienced men using the wrong packing, as sometimes occurs where various packings are employed.

In the embodiment shown in Fig. III there are a plurality of strips spirally twisted upon a wire core 3. The strips are arranged with the ends overlapping to break joints as indicated in Fig. III so that the completed strand of packing is a substantially continuous strand 4 of packing material and may be made in any suitable length.

In the embodiment shown in Fig. IV a single strand 2 is spirally twisted into a strand 5.

In the embodiment shown in Fig. V two strips only are employed, as for instance, a strip of aluminum and a strip of lead foil. I have not attempted to indicate any difference in the metal in the drawings.

In the embodiment shown in Fig. VI a strand 6 is utilized as a core, a crumpled strip 7 being spirally twisted about this core.

In the embodiment shown in Fig. VII the strand 4 is provided with a braided covering 8, preferably of wire. The cross sections of Figs. VIII and IX are intended to illustrate the crumpled interwoven character of the twisted strands.

These views are, of course, exaggerated and arbitrary in that there is no fixed relation for the convolutions formed by the crumpling and the twisting. The lubricant is effectively retained in the formed strands even when pressures are applied thereto, thus providing a self-lubricating packing which may be manipulated and applied in a great many ways. The packing is very durable when subjected to wear such as that of reciprocating or rotating parts; is economical to use in that it may be formed in relatively long strips or strands and cut to the desired length, being coiled as indicated in Fig. XI for convenience in packing or use.

I have illustrated and described several embodiments and adaptations of my improvements which I believe will enable those skilled in the art to which my invention relates to embody or adapt the same as may be desired.

Having thus described my invention what I claim as new and desire to secure by Letters Patent is:

1. A packing comprising strips of sheet lead, sheet aluminum and sheet copper of substantial width, coated with lubricant and spirally twisted into a strand, and compacted.

2. A packing comprising strips of sheet lead, and sheet aluminum of substantial width, coated with lubricant and crumpled and twisted into a strand, and compacted.

3. A packing comprising strips of sheet lead and sheet copper of substantial width, coated with lubricant and crumpled and twisted into a strand, and compacted.

4. A packing comprising strips of sheet lead, sheet aluminum and sheet copper, coated with lubricant and twisted into a strand.

5. A packing comprising strips of sheet lead and sheet aluminum coated with lubricant and twisted into a strand.

6. A packing comprising strips of sheet lead and sheet copper coated with lubricant and twisted into a strand.

7. A packing consisting of strips of sheet metal of substantial width, coated with lubricant and crumpled and twisted into a strand, and compacted.

8. A packing material consisting of strips of sheet metal coated with lubricant and twisted into a strand.

9. A packing material consisting of a strip of sheet metal coated with lubricant and twisted into a strand.

10. A packing material consisting of a core and a plurality of strips of thin sheet metal coated with lubricant and spirally twisted upon said core.

11. A packing material consisting of sheet metal coated with lubricant and crumpled and twisted into a strand, and a covering for said strand.

12. A packing material consisting of a central core comprising a plurality of strips of sheet metal coated with lubricant, and twisted together into a strand, and a covering therefor formed of strips of metal coated with lubricant, and twisted upon said core.

13. A packing material consisting of a core comprising sheet metal coated with a lubricant and twisted into a strand, and a covering for said strand.

14. The method of manufacturing packings consisting of spirally twisting strips of different kinds of metal foil of substantial width coated with lubricant into a strand.

15. The method of manufacturing packings consisting of spirally twisting strips of metal foil of substantial width coated with lubricant into a strand.

16. The method of manufacturing packings consisting of spirally twisting a strip of metal foil coated with lubricant into a strand.

17. The method of manufacturing packings consisting of spirally twisting a plurality of strips of metal foil into a strand, and compacting.

18. The method of manufacturing packings consisting of coating a strip of metal foil of substantial width with a lubricant, and spirally twisting into a strand.

19. The process of manufacturing packings consisting of coating strips of metal foil with a lubricant, crumpling, and spirally twisting into a strand.

In witness whereof, I have hereunto set my hand and seal.

CHARLES C. HALL. [L. S.]